Aug. 19, 1952 — L. A. McNABB — 2,607,545
REEL DRIVE MECHANISM FOR MOTION-PICTURE FILM REELS
Filed April 15, 1947 — 3 Sheets-Sheet 1
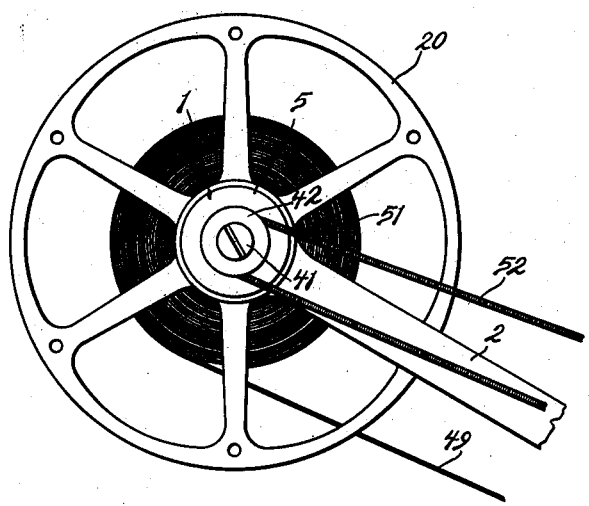
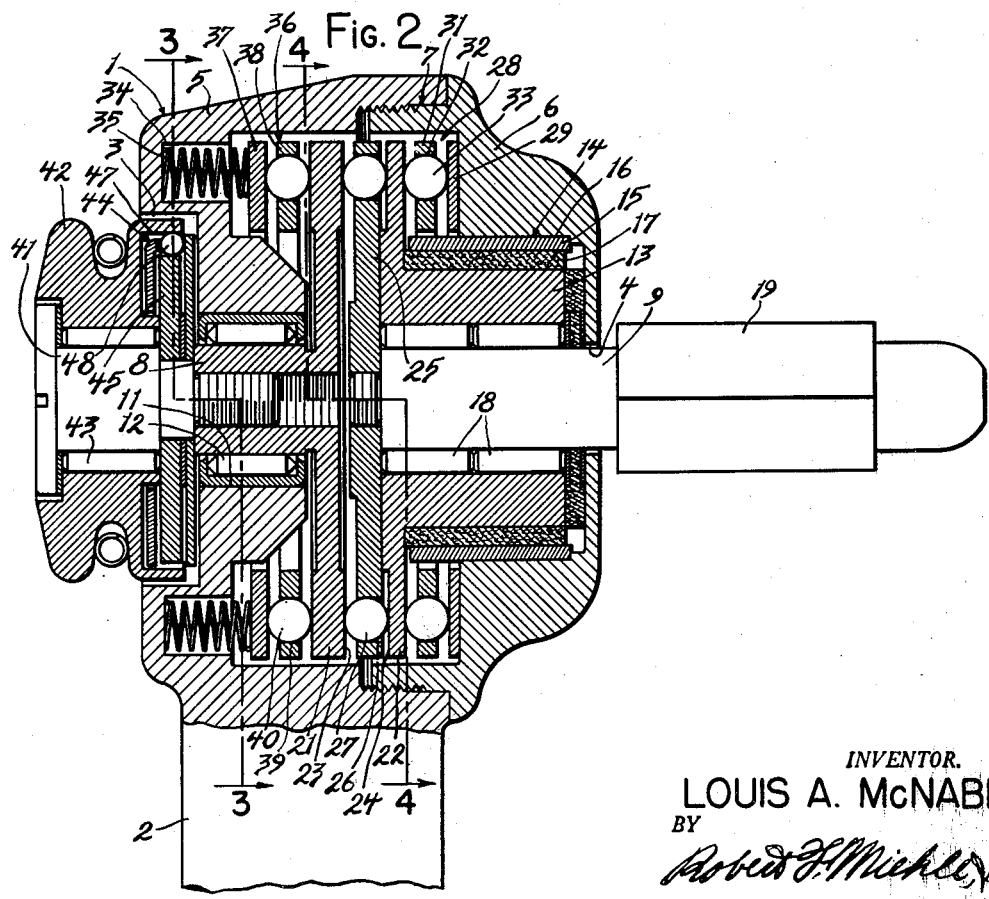
*INVENTOR.*
LOUIS A. McNABB
BY
Robert F. Miehle
ATTY.

Aug. 19, 1952  L. A. McNABB  2,607,545
REEL DRIVE MECHANISM FOR MOTION-PICTURE FILM REELS
Filed April 15, 1947  3 Sheets-Sheet 2

*INVENTOR.*
LOUIS A. McNABB
BY
Robert H. Miehle, Jr.
ATTY.

Aug. 19, 1952 L. A. McNABB 2,607,545
REEL DRIVE MECHANISM FOR MOTION-PICTURE FILM REELS
Filed April 15, 1947 3 Sheets-Sheet 3

INVENTOR.
LOUIS A. McNABB

Patented Aug. 19, 1952

2,607,545

UNITED STATES PATENT OFFICE 2,607,545

REEL DRIVE MECHANISM FOR MOTION-PICTURE FILM REELS

Louis A. McNabb, Glenview, Ill., assignor to Bell & Howell Company, Chicago, Ill., a corporation of Illinois Application April 15, 1947, Serial No. 741,485

8 Claims. (Cl. 242—55)

My invention relates particularly to take up or rewinding reel drives for motion picture projecting machines, although not limited to this use alone.

It is usual to drive the take up reel of a motion picture projecting machine by means of a constant torque yielding drive mechanism permitting the slowing up of rotation of the reel to accommodate the increasing diameter of the film roll on the reel to the constant rate of feed of the film by the film feeding mechanism of the machine. Such drive devices are limited in such accommodation in that, if their torque is increased to accommodate greater ranges of take up film roll diameters, undesirably excessive strain is exerted on the film at small take up film roll diameters.

The main object of the present invention resides in the provision of a novel, compact and effective yielding drive mechanism which automatically increases the torque exerted on the take up reel as the diameter of the film roll thereon increases to the end of increasing the range of film roll diameter which may be accommodated without exerting excessive strain on the film, which is also adapted and may be desirably employed for rewinding film from one reel to another at high speed, and which when driven by a belt and pulley transmission does not place excessive strain on the driving belt. Other objects of the invention will hereinafter appear.

The invention will be better understood by reference to the accompanying drawing forming a part hereof and in which—

Figure 1 is an end elevation of a reel drive mechanism embodying my invention and showing it in a form adapted for serving as the drive of a take up reel of a motion picture projecting machine;

Figure 2 is a sectional view of the same taken on an axial plane of the same;

Figure 5:
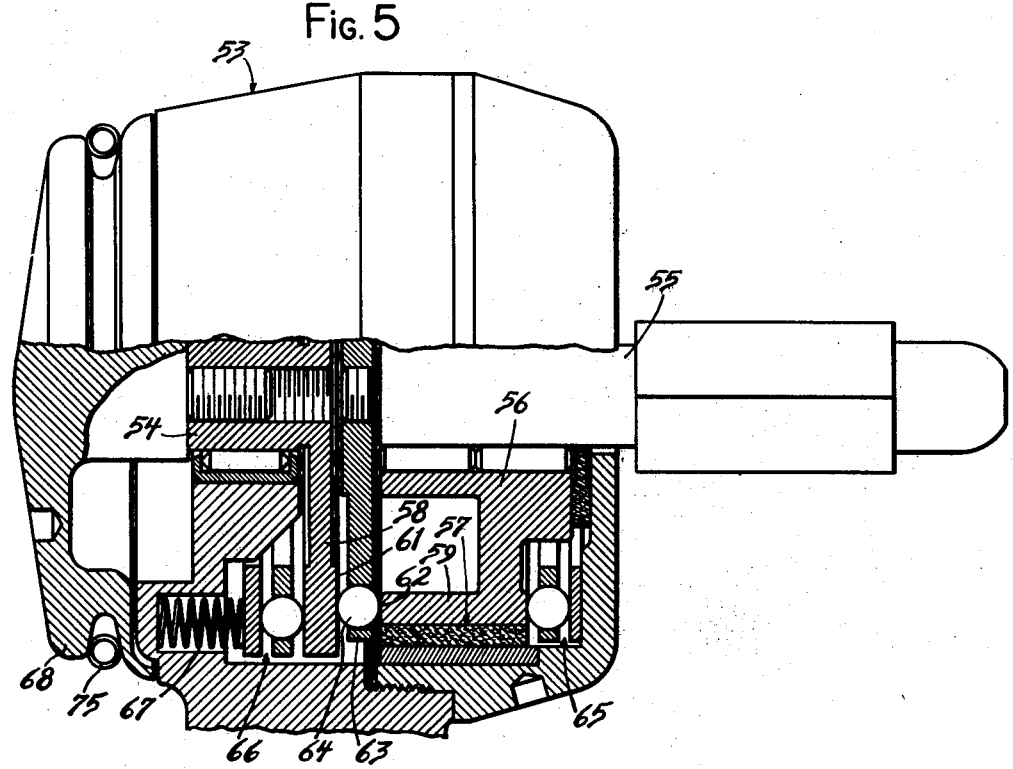
Figure 6:
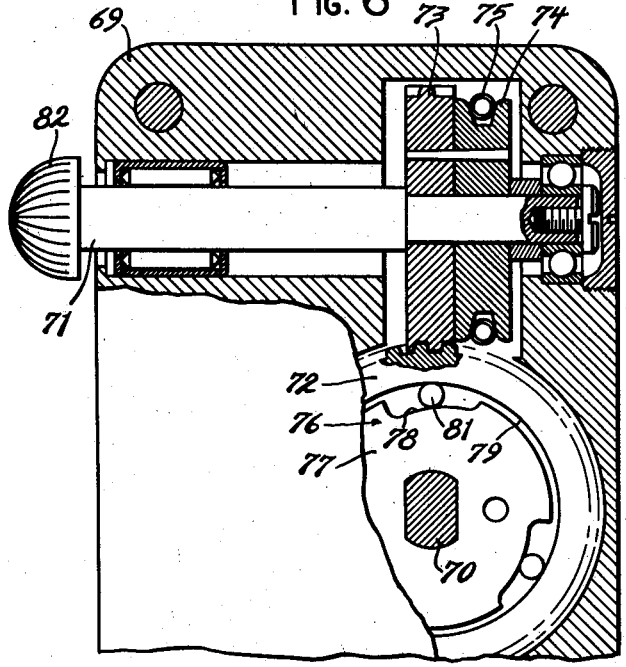

Figure 5 is a side elevational view of a reel drive mechanism embodying my invention with parts thereof broken away and shown in partial section and showing it in another form adapted for serving as the drive of a feed and rewind reel of a motion picture projecting machine; and Figure 6 is a partial front elevational view of the mechanism of a motion picture projecting machine with parts broken away and shown in section and showing driving mechanism of my invention which serves to drive the reel drive mechanism of Figure 5.

Referring to Figures 1 to 4 inclusive, a generally cylindrical housing 1 is carried on the extending end of a support or reel arm 2. The housing, see particularly Figure 2, is provided with alined bores, respectively designated at 3 and 4, through opposite end walls thereof, and comprises two parts 5 and 6 detachably secured together transversely of the bores 3 and 4, for the purpose of assembly, by a usual screwthread and shoulder connection 7 disposed at the cylindrical wall of the housing in concentric relation with the bores 3 and 4, the housing part 5 being formed integrally with the support arm 2.

A rotatable driving member 8 and a rotatable reel spindle 9 are disposed along the axis of the driving mechanism, which is the axis of the bores 3 and 4 of the housing parts 5 and 6, and respectively extend in these bores, and the driving member 8 is disposed within the housing and is rotatably mounted in an inner reduced portion 11 of the bore 3 by means of a roller bearing 12. A concentrically bored rotatable reaction member 13 is disposed within the housing on the axis of the bores 3 and 4 and is mounted for rotation on a friction bearing 14 comprising a concentrically bored cylindrical bearing member 15 fixedly mounted in an inner enlarged portion 16 of the bore 4 within which the reaction member extends and another concentrically bored cylindrical bearing member 17 of suitable friction material extending and frictionally engaged for rotation in the bore of the bearing member 15 and within the bore of which the reaction member extends and is secured. The inner or driving member adjacent portion of the reel spindle 9 extends through and is supported in the bore of the reaction member 13 for rotation with respect to the reaction member by means of a double roller bearing 18, and the outer or driving member remote portion of the reel spindle extends outwardly beyond the housing and the reaction member and is in the form of a conventional reel mount 19 adapted for the detachable mounting thereon of a film reel 20, shown in Figure 1, in driving engagement therewith as is usual in motion picture reel mounts.

Figure 3:
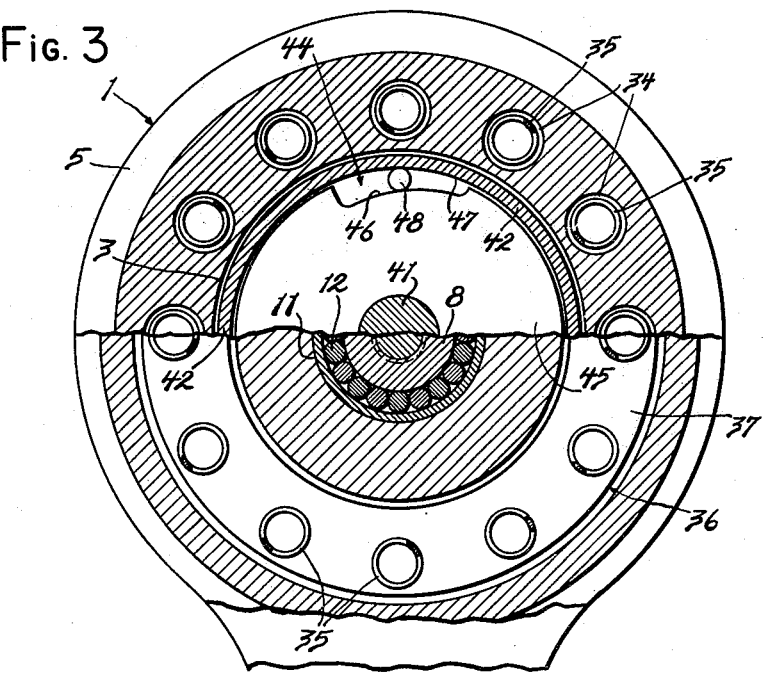
Figure 3 is a sectional view substantially on the line 3—3 of Figure 2.
Figure 4:
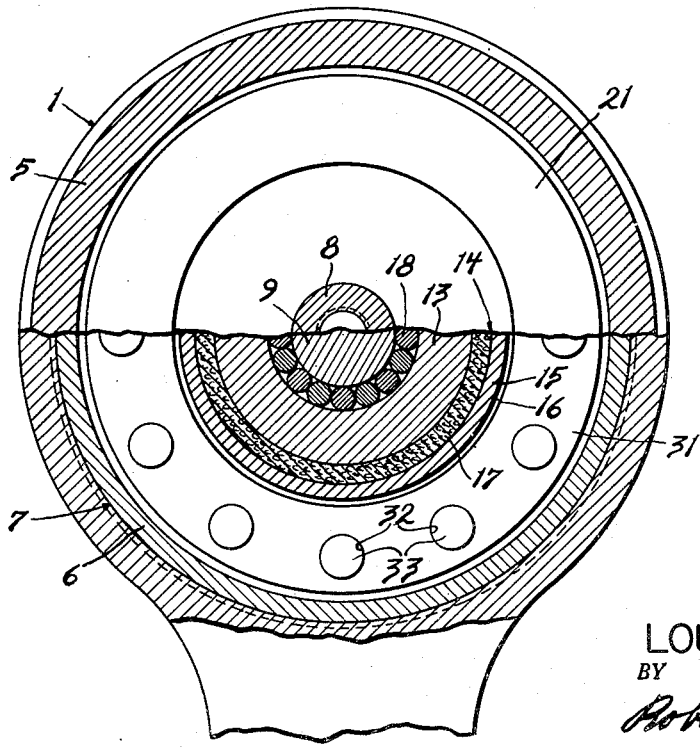
Figure 4 is a sectional view substantially on the line 4—4 of Figure 2.

The driving member 8 is provided with a radial flange 21 formed integrally therewith and the reaction member 13 is also provided with a radial flange 22 formed integrally therewith, see Figures 2 and 4; and these flanges are disposed within the housing in axially spaced relation and each flange provides one of two spaced opposing axially facing surfaces of revolution within the housing and respectively designated at 23 and 24. The inner end of the reel spindle 9 is provided with a radial flange 25 fixed for rotation therewith and disposed within the housing and between the flanges 21 and 22 and their aforesaid surfaces of revolution 23 and 24. The flange 25 is provided with a series of apertures 26 therethrough and spaced angularly thereabout, and transmission rollers in the form of bearing balls 27 are respectively rotatably engaged in these apertures for rotation and for bodily rotation with the flange 25 and the reel spindle, the flange 25 serving as a carrier for the balls 27. The balls 27 are disposed between the surfaces of revolution 23 and 24 for rolling engagement therewith in differential relation with the driving and reaction members 8 and 13.

Pressure means is provided within the housing and is operative on the driving and reaction members 8 and 13 longitudinally of the axis of the mechanism to effect pressure engagement between the balls 27 and the surfaces of revolution 23 and 24 and will now be described. See Figures 2, 3 and 4.

An antifriction axial thrust bearing 28 within the housing is operative between the housing part 6 and the reaction member flange 22 to oppose axial movement of this flange away from the reel spindle flange 25 and comprises an annular bearing member 29 engageable against the housing part 6, a rotatable annular carrier member 31 disposed between this bearing member and the reaction member flange 22 and provided with a series of apertures 32 therethrough and spaced angularly thereabout, and bearing balls 33 respectively rotatably engaged in these apertures and disposed between and oppositely engageable with the bearing member 29 and the reaction member flange 22.

The casing part 5 is provided internally thereof with a series of blind bores 34 angularly spaced about and disposed in parallelism with the axis of the driving mechanism and facing in the direction of the driving member flange 21, and a series of compression springs 35 within the housing are respectively engaged and seated in these bores and project toward the driving member flange. An antifriction axial thrust bearing 36 within the housing is operative between the springs 35 and the driving member flange 21 to oppose axial movement of this flange away from the reel spindle flange 25 and comprises an annular bearing member 37 engageable against the springs 35, a rotatable annular carrier member 38 disposed between this bearing member and the driving member flange 21 and provided with a series of apertures 39 therethrough and spaced angularly thereabout, and bearing balls 40 respectively rotatably engaged in these apertures and disposed between and oppositely engageable with the bearing member 37 and the driving member flange 21.

Thus, the bearings 28 and 36 are respectively operative on the driving and reaction members in opposing relation with each other, and the bearing 28 reacts on the housing part 6 and the springs 35 are operative between the bearing 36 and the housing part 5 to effect pressure and consequently rolling transmission engagement between the transmission balls 27 and the surfaces of revolution 23 and 24 of the driving and reaction member flanges 21 and 22, this arrangement providing for assembly of the driving mechanism in cooperation with the separable housing parts 5 and 6.

A headed and shouldered stud 41 is screw-threaded into the outer end of the driving member 8 in coaxial relation therewith, and a bored pulley 42 is rotatably mounted on the stud 41 by means of a roller bearing 43 for rotation with respect to the driving member on the axis of the driving mechanism. See Figures 2 and 3. An overrunning clutch 44 is disposed on the axis of the driving mechanism and serves to drive the driving member 8 from the pulley 42 in one direction only, and comprises a bored cam disk 45 secured on the driving member by the stud 41 and provided with a radial cam portion 46 at the periphery thereof, an internal clutch surface 47 on the pulley and surrounding the cam disk, and a ball 48 disposed between the cam portion and the clutch surface and adapted to be placed in clutching engagement with the clutch surface 47 by the cam portion 46 when the pulley is rotated in one direction relative to the driving member and to be released from the clutch surface when the relative rotation of the pulley is in the opposite direction.

The driving mechanism above described is adapted for taking up a film 49 in the form of a roll 51, see Figure 1, on the reel 20 mounted on the reel spindle 9, increasing in diameter as the film is fed thereto from the constant feed mechanism of a motion picture projecting machine, not shown, and the pulley 42 is driven from the projecting machine, through the medium of a belt 52 trained over the pulley to drive the driving member 8 through the overrunning clutch 44.

As the pulley 42 is driven in the direction to drive the driving member 8 through the one way clutch 44, the transmission balls 27, being connected with the reel spindle 9 for bodily rotation therewith and having rolling transmission engagement with the surfaces of revolution 23 and 24 of the driving and reaction members 8 and 13 in differential relation therewith, tend to rotate the reel spindle and the reaction member in opposite directions. The friction bearing 14 is operative on the reaction member to retard rotation thereof and causes torque varying in correspondence with the amount of braking or retarding force exerted on the reaction member by the bearing 14, to be exerted on the reel spindle and on the film roll 51 on the reel 20 to wind the film 49 thereon.

Observing that the reaction member 13 supports the reel spindle 9 and with it the reel 20 and film roll 51, increase in weight of the film roll as the film roll increases in diameter, increases the braking or retarding action exerted by the bearing 14 on the reaction member, so that the torque exerted on the reel spindle and film roll increases as the diameter of the film roll increases and adequate torque is exerted on the film roll at large film roll diameters without exerting excessive torque on the film roll and resulting excessive tension on the film at small film roll diameters, thus increasing the range of film roll diameter which can be accommodated.

It will be observed that the driving mechanism provides a reduction drive from the drive member 8 to the reel spindle 9, so that the driving strain on the belt 52 is correspondingly reduced.

Referring to Figures 5 and 6, the driving mechanism shown in Figure 5 is essentially the same as above described and functions in the same manner but is adapted for driving the feed and rewind reel of a motion picture projecting machine for rewinding film on this reel at high speed from the take up reel of the machine such as the reel 20 mounted on the reel spindle 9 of Figures 1 to 4, the film being free from the feed mechanism of the machine and passing directly from the take up reel to the feed and rewind reel during the rewinding operation.

In brief the driving mechanism of Figure 5 comprises a housing 53 enclosing the driving mechanism, a rotatable driving member 54 and a reel spindle 55 disposed along the axis of the driving mechanism, a concentrically bored reaction member 56 supporting the reel spindle within the bore thereof for rotation with respect thereto, a friction bearing 57 on which the reaction member is mounted for rotation, a radial flange 58 formed integrally with the driving member 54 and a peripheral rim 59 on the reaction member 56 each providing one of two spaced opposing axially facing surfaces of revolution respectively designated at 61 and 62, a transmission roller carrier 63 fixed for rotation on the inner end of the reel spindle 55 and carrying rotatable rollers in the form of bearing balls 64 for bodily rotation with the reel spindle, which balls are disposed between the surfaces of revolution 61 and 62 for rolling engagement therewith in differential relation with the driving and reaction members 54 and 56, and pressure means operative on the driving and reaction members longitudinally of the axis of the mechanism to effect pressure and consequently rolling transmission engagement between the balls 64 and the surfaces of revolution 61 and 62 and comprising antifriction axial thrust bearings 65 and 66 respectively operative on the driving and reaction members in opposing relation with each other and springs 67 operative in cooperation with these bearings to effect said pressure engagement. A pulley 68 is secured on the outer end of the driving member 54 for driving the same.

Referring to Figure 6, the mechanism of the projecting machine is carried on a frame 69 and includes a forwardly and rearwardly extending drive shaft 70 rotatably mounted within the frame and driven from a motor, not shown, which drives the film feed mechanism of the machine and which also drives the take up reel spindle driving belt 52 of Figure 1. Another shaft 71 is rotatably mounted within the frame and is disposed transversely of the shaft 70. A spiral gear 72 is rotatably mounted in coaxial relation with the shaft 70 for rotation with respect thereto and meshes with another spiral gear 73 which is secured on the shaft 71 for driving this shaft from the gear 72, and the pulley 68 is driven for driving the reel spindle 55 from the shaft 71 and consequently from the gear 72 by a pulley 74 secured with the gear 73 and a belt 75 trained over the pulleys 68 and 74. An overrunning clutch 76 is disposed on the axis of the shaft 70 and serves to drive the gear 72 from the shaft 70 in one direction only. This clutch comprises a cam disk 77 secured on the shaft 70 and provided with corresponding radial cam portions 78 angularly spaced about the periphery thereof, an internal clutch surface 79 on the gear 72 and surrounding the cam disk, and balls 81 disposed between the cam portions and the clutch surface and adapted to be placed in clutching engagement with the clutch surface 79 by the cam portions 78 when the shaft 70 is rotated in one direction relative to the gear 72 and to be released from the clutch surface when the relative rotation of this shaft and gear is in the opposite direction.

The driving mechanism of Figures 5 and 6 is adapted for rewinding a film at high speed from one reel, say the take up reel 20 of Figure 1, onto another reel, not shown, mounted on the reel spindle 55, in the form of a roll increasing in diameter as the film is wound thereon, and for this purpose the friction bearing 57 of the reaction member 56 of this driving mechanism is relatively large to develop the relatively large amount of torque required for rewinding at high speed.

For the purpose of manually actuating the feed mechanism of the projecting machine, say for positioning the same in a desired position of its cycle or testing the lacing of the film on the machine, see Figure 6, one end of the shaft 71 is extended outwardly from the frame 69 and is provided with a knob 82 by means of which the mechanism of the machine may be conveniently actuated when it is not being driven by the motor. While the mechanism of the machine may be actuated in but one direction by the knob 82 because the overrunning clutch 76 is interposed between the shaft 70 and the knob, this arrangement is of advantage in that the knob rotates very slowly when the mechanism of the machine is being driven by the motor of the machine for the projection of motion pictures and so is not annoying or dangerous during the projection of pictures.

Assuming that the reel spindles 9 and 55 of Figures 1 and 5 respectively serve as the take up and feed and rewind spindles of a motion picture projecting machine and that the motor of the machine is reversible, is permanently connected with the belt 52 and shaft 70 to drive the reel spindles, and is connected with the film feeding mechanism of the machine by a releasable clutch, pictures are projected with the driving motor operating in one direction, with the feed mechanism drive clutch engaged and with the film laced in the machine and drawn thereby from a feed and rewind reel mounted on the reel spindle 55 and fed to a take up reel mounted on the reel spindle 9, the overrunning clutches 44 and 76 being so arranged that the clutch 44 drives the take up reel spindle 9 to take up the film on the take up reel on this spindle and the feed and rewind spindle 55 is free from drive by the motor to permit the film to be drawn from the feed and rewind reel on the spindle 55 by the feed mechanism during operation of the motor in the direction for projecting pictures and that the clutch 76 drives the feed and rewind spindle 55 and the take up spindle 9 is free from drive by the motor when the motor is operated in the opposite direction for rewinding the film from a reel on the take up spindle onto a reel on the feed and rewind spindle. The film is free from the feed mechanism of the machine and passes directly from the take up reel to the feed and rewind reel and the feed mechanism drive clutch is disengaged during the rewinding operation.

While I have thus described my invention, I do not wish to be limited to the precise details described, as changes may be readily made without departing from the spirit of my invention, but having thus described my invention, I claim as new and desire to secure by Letters Patent the following:

1. In a reel drive mechanism, the combination of a rotatable driving member and a rotatable reeling member for reeling a strip in the form of a roll increasing in diameter as the strip is reeled thereon, a rotatable reaction member supporting said reeling member for rotation with respect thereto, brake means downwardly on which said reaction member bears to retard rotation of said reaction member with resistance increasing with increase of weight on said reeling member, and rotatable transmission means carried with said reeling member for bodily rotation therewith and having rolling transmission engagement with said driving and reaction members in differential relation therewith.

2. In a reel driving mechanism, the combination of a rotatable driving member and a rotatable reel spindle, a rotatable concentrically bored reaction member, said spindle extending in and being supported in the bore of said reaction member for rotation with respect to said reaction member, a friction bearing supporting said reaction member for rotation and operative to retard rotation thereof with resistance increasing with increase of weight on said spindle, and rotatable transmission means carried with said spindle for bodily rotation therewith and having rolling transmission engagement with said driving and reaction members in differential relation therewith.

3. In a reel drive mechanism, the combination of a rotatable driving member and a rotatable reel spindle disposed along a common axis, a concentrically bored rotatable reaction member disposed on said axis, the driving member adjacent portion of said spindle extending and being supported in the bore of said reaction member for rotation with respect to said reaction member and the driving member remote portion of said spindle extending beyond said reaction member and forming a reel mount portion, a friction bearing supporting said reaction member for rotation and operative to retard rotation thereof with resistance increasing with increase of weight on said spindle and comprising a bored bearing member in which said reaction member is engaged for rotation, and rotatable transmission means in the region of the adjacent portions of said driving member and spindle and fixed with said spindle for bodily rotation therewith and having rolling transmission engagement with said driving and reaction members in differential relation therewith.

4. In a reel drive mechanism, the combination of a housing provided with alined bores through opposite walls thereof and comprising two parts detachably secured together transversely of said bores and respectively forming said walls, a rotatable driving member and a rotatable reel spindle disposed along the axis of said bores and respectively extending in said bores and said driving member being mounted for rotation on the housing part in the bore of which it extends, a concentrically bored rotatable reaction member within said housing and disposed on said axis, the driving member adjacent portion of said spindle extending through and being supported in the bore of said reaction member for rotation with respect to said reaction member and the driving member remote portion of said spindle extending beyond said housing and reaction member and forming a reel mount portion, a friction bearing supporting said reaction member for rotation on the other of said housing parts and operative to retard rotation of said reaction member with resistance increasing with increase of weight on said spindle, and rotatable transmission means within said housing and in the region of the adjacent portions of said driving member and spindle and fixed with said spindle for bodily rotation therewith and having rolling transmission engagement with said driving and reaction members in differential relation therewith.

5. In a reel drive mechanism, the combination of a rotatable driving member and a rotatable reeling member arranged on a common axis, a rotatable reaction member disposed on said axis and supporting said reeling member for rotation with respect thereto, brake means downwardly on which said reaction member bears to retard rotation of said reaction member with resistance increasing with increase of weight on said reeling member, said driving and reaction members being each provided with one of two spaced opposing axially facing surfaces of revolution, rotatable roller means carried with said reeling member for bodily rotation therewith and disposed between said surfaces of revolution for rolling engagement therewith in differential relation with said driving and reaction members, and pressure means operative on said driving and reaction members longitudinally of said axis to effect pressure engagement between said roller means and surfaces of revolution.

6. In a reel drive mechanism, the combination of a rotatable driving member and a rotatable reel spindle disposed on a common axis, a rotatable concentrically bored reaction member disposed on said axis, said spindle extending in and being supported in the bore of said reaction member for rotation with respect to said reaction member, a friction bearing supporting said reaction member for rotation and operative to retard rotation thereof with resistance increasing with increase of weight on said spindle, said driving and reaction members being each provided with one of two spaced opposing axially facing surfaces of revolution, a roller carrier disposed between said surfaces and secured with said spindle for rotation therewith, rotatable rollers carried with said carrier in angularly spaced relation about said axis for bodily rotation with said carrier and disposed between said surfaces of revolution for rolling engagement therewith in differential relation with said driving and reaction members, and pressure means operative on said driving and reaction members longitudinally of said axis to effect pressure engagement between said rollers and surfaces of revolution.

7. In a reel drive mechanism, the combination of a rotatable driving member and a rotatable reel spindle disposed along a common axis, a rotatable concentrically bored reaction member disposed on said axis, the driving member adjacent portion of said spindle extending in and being supported in the bore of said reaction member for rotation with respect to said reaction member and the driving member remote portion of said spindle extending beyond said reaction member and forming a reel mount portion, a friction bearing supporting said reaction member for rotation and operative to retard rotation thereof with resistance increasing with increase of weight on said spindle and comprising a bored bearing member in which said reaction member extends, said driving and reaction members being each provided with one of two spaced opposing axially facing surfaces of revolution, a roller carrier disposed between said surfaces and secured with said spindle for rotation therewith, rotatable rollers carried with said carrier in angularly spaced relation about said axis for bodily rotation with said carrier and disposed between said surfaces of revolution for rolling engagement therewith in differential relation with said driving and reaction members, and pressure means operative on said driving and reaction members longitudinally of said axis to effect pressure engagement between said rollers and surfaces of revolution and comprising antifriction axial thrust bearings respectively operative on said driving and reaction members in opposing relation with each other.

8. In a reel drive mechanism, the combination of a housing provided with alined bores through opposite walls thereof and comprising two parts detachably secured together transversely of said bores and respectively forming said walls, a rotatable driving member and a rotatable reel spindle disposed along the axis of said bores and respectively extending in said bores and said driving member being mounted for rotation on the housing part in the bore of which it extends, a concentrically bored rotatable reaction member within said housing and disposed on said axis, the driving member adjacent portion of said spindle extending through and being supported in the bore of said reaction member for rotation with respect to said reaction member and the driving member remote portion of said spindle extending beyond said housing and reaction member and forming a reel mount portion, a friction bearing supporting said reaction member for rotation on the other of said housing parts and operative to retard rotation thereof with resistance increasing with increase of weight on said spindle, said driving and reaction members being each provided with one of two spaced opposing axially facing surfaces of revolution within said housing, a roller carrier within said housing and disposed between said surfaces and secured with said spindle for rotation therewith, rotatable rollers carried with said carrier in angularly spaced relation about said axis for bodily rotation with said carrier and disposed between said surfaces of revolution for rolling engagement therewith in differential relation with said driving and reaction members, and pressure means within said housing and operative on said driving and reaction members longitudinally of said axis to effect pressure engagement between said rollers and surfaces of revolution and comprising antifriction axial thrust bearings respectively operative on said driving and reaction members in opposing relation with each other and of which thrust bearings one reacts on one of said housing parts and spring means operative between the other of said thrust bearings and the other of said housing parts to effect said pressure engagement.

LOUIS A. McNABB.

REFERENCES CITED

The following references are of record in the file of this patent:

UNITED STATES PATENTS

| Number | Name | Date |
|---|---|---|
| 1,377,112 | Boylan | May 3, 1921 |
| 1,733,830 | Smith | Oct. 22, 1929 |
| 1,737,295 | Bronander | Nov. 26, 1929 |
| 2,280,727 | Stechbart | Apr. 21, 1942 |
| 2,321,812 | Heller et al. | June 15, 1943 |
| 2,383,107 | Cherry | Aug. 21, 1945 |